United States Patent [19]
Fujisawa

[11] Patent Number: 5,892,844
[45] Date of Patent: Apr. 6, 1999

[54] IMAGE PROCESSING APPARATUS

[75] Inventor: Tetsuo Fujisawa, Saitama-ken, Japan

[73] Assignee: Ricoh Company, Ltd., Tokyo, Japan

[21] Appl. No.: 748,786

[22] Filed: Nov. 14, 1996

[30] Foreign Application Priority Data

Nov. 14, 1995 [JP] Japan ................................. 7-319534

[51] Int. Cl.[6] .................................................. G06K 9/34
[52] U.S. Cl. ......................................... 382/177; 382/301
[58] Field of Search .................................. 382/177, 178, 382/179, 292, 301; 358/449, 451

[56] References Cited

U.S. PATENT DOCUMENTS

| 5,509,092 | 4/1996 | Hirayama et al. | 382/301 |
| 5,566,252 | 10/1996 | Miyaza | 382/301 |
| 5,613,017 | 3/1997 | Rao et al. | 382/292 |

Primary Examiner—Phuoc Tran
Attorney, Agent, or Firm—Oblon, Spivak, McClelland, Maier & Neustadt, P.C.

[57] ABSTRACT

An image forming process system in which an original document which includes characters to be copies is scanned. A desired magnification ratio for magnifying the original document can also be input. Further, the characters in the original document are segmented for magnifying the characters by the desired magnification ratio. This magnification operation is performed such that only the characters in the segments are magnified so that the copied and magnified characters are centered at the segments, and such that a size of the copied document is the same as the size of the original document. An operation may further be provided in which the input desired magnification ratio is based on an operator inputting a minimum distance to be maintained between the characters after the magnifying operation, so that the input magnification ratio is calculated based on this minimum distance.

16 Claims, 11 Drawing Sheets

本システムのプリント基板は、CPU、メモリ、I/O、画像処理の各デバイスにより構成されている。

CPUは486DX50MHz、メモリはアクセスタイム70nsのDRAMが標準で8MB搭載されていて、最大16MBまで増設可能である。

I/OはパラレルI/F、シリアルI/F、SCSI I/F、タイマーから構成される。

画像処理は、拡大、縮小、回転、合成、移動、認識、などの処理を高速に行い、処理結果をメモリに格納する。

入出力I/Fは、CN1、CN2を用いて行う。CN1は画像データの入出力用、CN2はSCSI I/F、パラレルI/F、シリアルI/F用である。

Segment for character before magnification process

Segment for character after magnification process

Segment for character before magnification process

Segment for character after magnification process

Figure 9

本システムのプリント基板は、CPU、メモリ、I／O、画像処理の各デバイスにより構成されている。
CPUは486DX50MHz、メモリはアクセスタイム80nsのDRAMが標準で8MB搭載されていて、最大16MBまで増設可能である。
I／Oはパラレル I／F、シリアル I／F、SCSI I／F、タイマーから構成される。
画像処理は、拡大、縮小、回転、合成、移動、認識、などの処理を高速に行い、処理結果をメモリに格納する。
入出力 I／Fは、CN1、CN2を用いて行う。CN1は画像データの入出力用、CN2はSCSI I／F、パラレル I／F、シリアル I／F用である。

IMAGE PROCESSING APPARATUS

BACKGROUND OF THE INVENTION

1. Field of the Invention

The present invention is directed to an image processing apparatus used in an image forming apparatus such as a digital copier, etc., and more particularly, the present invention is directed to an image processing apparatus which includes a magnification unit for magnifying characters on an original document.

2. Discussion of the Background

In an image processing apparatus, FIG. 5 is a drawing of an original document used in a background image processing apparatus. FIG. 15 is a drawing showing a copied document formed from the original document of FIG. 5 with a magnification process in the background image processing apparatus.

As illustrated in FIG. 5, it is often difficult to read small characters on an original document. To make the small characters more readable, an operator may wish to enlarge the document by performing a magnification process. In the magnification process, an operator sets a magnification ratio for the small characters on the original document, such as for an original document size B5→A4 (115%), A4→A3 (141%), and a size of a recording paper such as A4, A3 in an image processing apparatus.

Characters on a copied document are enlarged by performing the magnification process in the image processing apparatus from an upper left edge portion (Xo, Yo) on the original document in the directions for scanning X and sub-scanning Y. It then becomes easy to read large characters on the copied document.

However, the above-mentioned image processing apparatus has a drawback in that a size of the original document is not the same as that of the copied document. It may then become inconvenient to have such documents with different sizes.

SUMMARY OF THE INVENTION

Accordingly, one object of this invention is to provide a novel image processing apparatus used in an image forming apparatus which can solve the aforementioned drawbacks in the background art.

In this way, one object of the present invention is to provide a novel image processing apparatus in which characters on a copied document are enlarged by performing a magnification process without enlarging a size of the copied document in comparison with that of an original document.

It is another object of the present invention is to provide a novel image processing apparatus in which characters on a copied document are enlarged with an optimal magnification ratio.

The present invention achieves these objectives by an image forming process system in which an original document which includes characters to be copies is scanned. A desired magnification ratio for magnifying the original document can also be input. Further, the characters in the original document are segmented for magnifying the characters within the segments by the desired magnification ratio. This magnification operation is performed such that the copied and magnified characters are centered at the segments, and such that a size of the copied document is the same as the size of the original document.

The present invention may further provide an operation in which the input desired magnification ratio is based on an operator inputting a minimum distance to be maintained between the characters after the magnifying operation, so that the input magnification ratio is calculated based on this minimum distance.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a drawing of an original document used as an example to explain operation in both a background image processing apparatus and the present image processing apparatus;

FIG. 6 is a drawing showing segments for characters on the original document of FIG. 5;

FIG. 9 is a drawing showing a copied document formed with the magnification process in accordance with the present invention;

FIG. 15 is a drawing showing a copied document formed with the magnification process in the background image processing apparatus.

DESCRIPTION OF THE PREFERRED EMBODIMENTS

Figure 1:
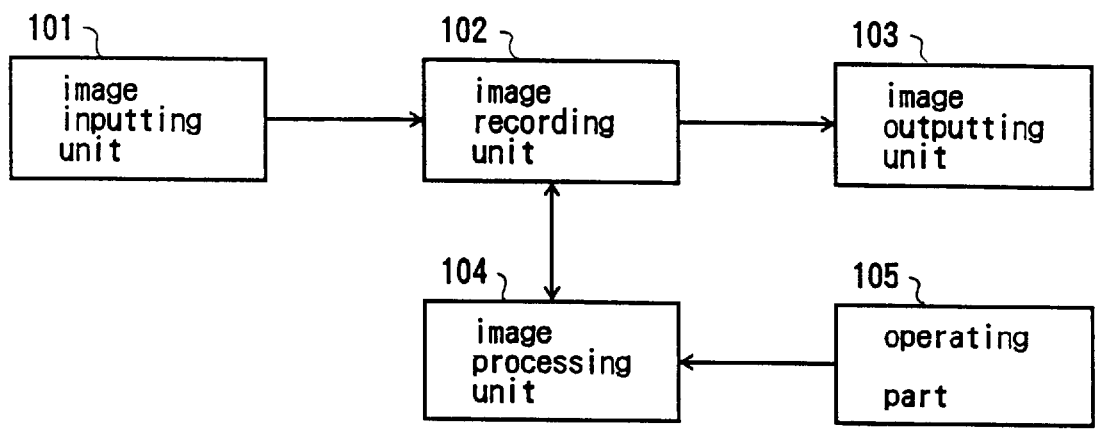
FIG. 1 is a block diagram showing an image processing apparatus in accordance with the present invention.

Preferred embodiments of an image processing apparatus used in an image forming apparatus in accordance with the present invention will now be explained with reference to the accompanying drawings, wherein like reference numerals are utilized to designate identical or corresponding elements throughout the several views.

FIG. 1 is a block diagram showing an image processing apparatus in accordance with the present invention. As illustrated in FIG. 1, an image inputting unit 101 is provided which provides an input image to an image recording unit 102. The image recording unit 102 is provided to store the input image, and then provides the stored image to an image outputting unit 103, such as a printer. An image processing unit 104 is also connected to the image recording unit 102, and an operating part 105 is provided to be connected to the image processing unit 104. The image processing unit 104 provides control operations in the image processing apparatus. The operating part 105 provides an input for an operator to control the control operations.

Figure 2:
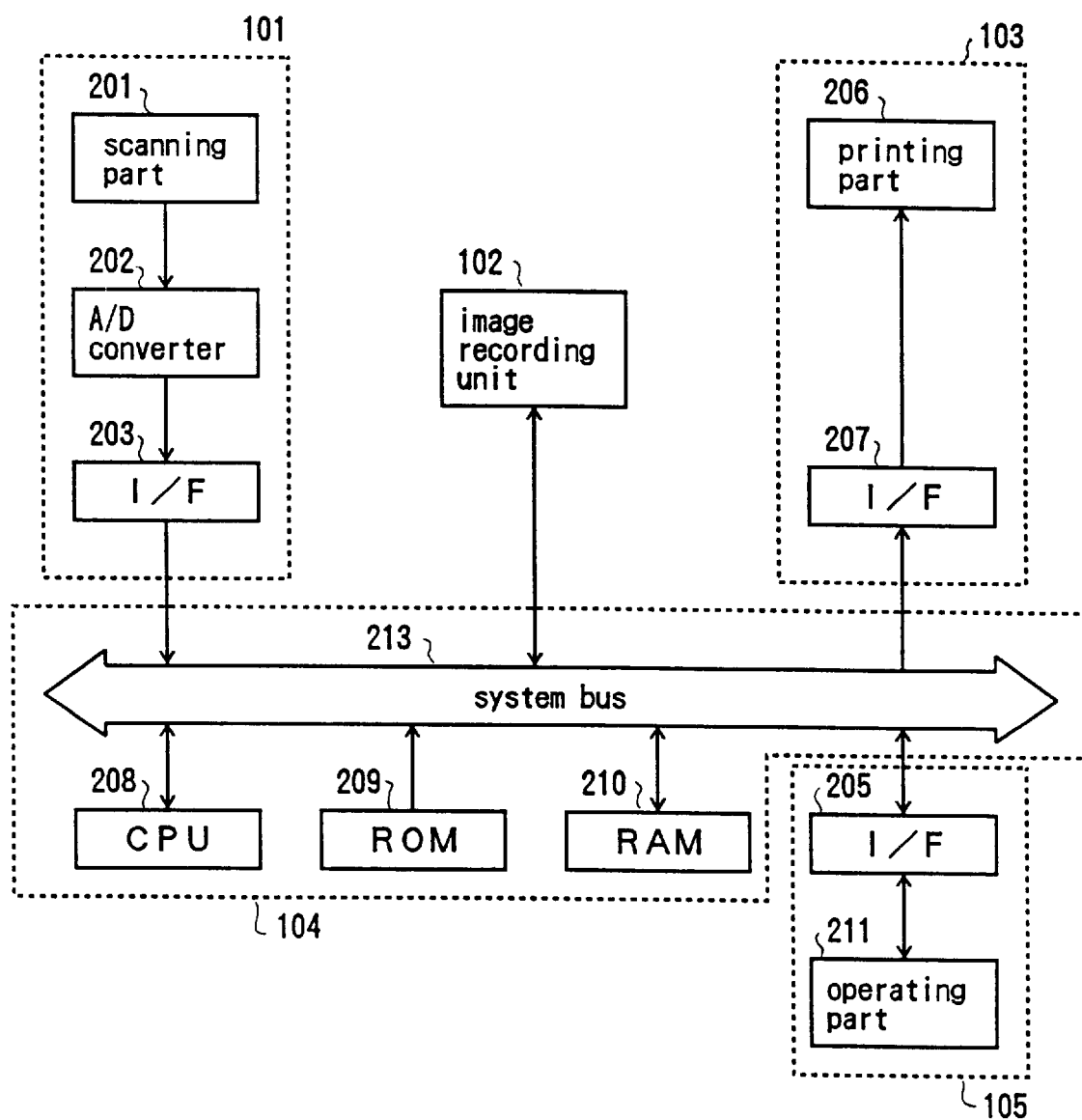
FIG. 2 is a block diagram showing a circuit of the image processing apparatus of FIG. 1 in accordance with the present invention.

FIG. 2 is a block diagram showing a further detailed diagram of the image processing apparatus of FIG. 1 in accordance with the present invention.

As illustrated in FIG. 2, the image inputting unit 101 includes a scanning part 201, A/D converter 202 and interface (I/F) 203. Scanning part 201 provides an output to the A/D converter 202. An output of this A/D converter 202 is provided to an interface 203, which in turn is connected to a system bus 213. Also connected to the system bus 213 is an image memory 204, a CPU 208, a ROM 209 and a RAM 210, these elements forming the image processing part 104. A printing part 206 is also connected to the system bus 213 through a further interface 207, these elements forming image outputting unit 103. Further, an operating part 211 is connected to the system bus 213 through a further interface 205, these elements forming operating part 105.

Figure 3:
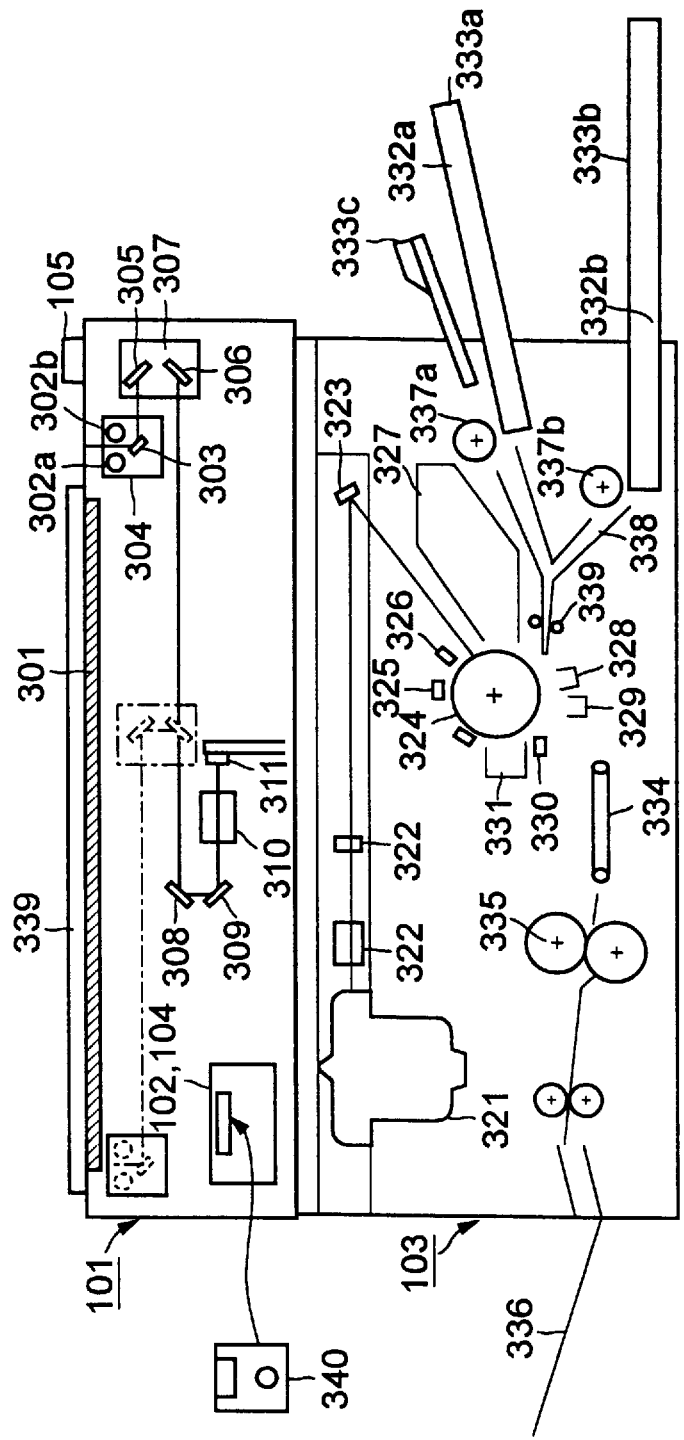
FIG. 3 is a drawing showing components of the image processing apparatus in accordance with the present invention.

FIG. 3 is a drawing showing components of the image processing apparatus of FIGS. 1 and 2 in accordance with the present invention. As illustrated in FIG. 3, image inputting unit 101 includes a contact glass 301 on which an original document is placed. The contact glass 301 is illuminated by light sources 302a and 302b which are formed in a first moving body 303. Light reflected off the document placed on the contact glass 301 is routed to reflect off a reflecting mirror 303, and to then reflect off reflecting mirrors 305 and 306, which form a second moving body 307. The light then further impinges off reflecting mirrors 308 and 309, through lens 310, and then onto an image sensor 311, such as a charge couple device. Also included in this image inputting unit 101 is the image processing and recording units 102, 104 in which a floppy disk 340 can be inserted.

Connected to this image inputting unit 101 is the image outputting unit 103. Image outputting unit 103 includes a laser emitting unit 321 which outputs a laser beam through lens system 322. The emitted laser beam reflects off reflecting mirror 323 to be directed towards a photosensitive body 324. Surrounding this photosensitive body 324 are a charger 325, an eraser 326, a developing portion 327, a transferring charger 328, a separating charger 329, a separating claw 330 and a cleaning part 331.

Recording paper 332a and 332b is provided for the image forming operations and is stored in recording paper cassettes 333a and 333b. A manual insertion tray 333c can also be provided for inserting paper of a different size as stored in recording paper cassettes 333a and 333b. After an image is formed on the paper sheets 332a, 332b, these paper sheets 332a, 332b are transported by transferring belt 334 to a fixing unit 335 to fix the image on the paper sheets 332a, 332b. The paper sheets 332a, 332b are then discharged to a paper discharging tray 336. This recording paper sheets 332a and 332b are respectively fed by paper feeding rollers 337a and 337b through a paper feeding path 338 to a registration roller 339.

This device as shown in FIG. 3 operates as follows. A document to be scanned is placed on the contact glass 301. Light issuing from light sources 302a and 302b are reflected by the document laid on the contact glass 301 and is then routed through mirrors 303, 305, 306, 308, 309, through lens 310, and to thereby form an image on the photosensitive body 324. The first moving body 303 and the second moving body 307 are moved to effectuate scanning of the document placed on the contact glass 301.

The image read by the image inputting unit 301 can then be written to the image recording unit 102, i.e., stored in a memory, and can be subject to processing, for example a magnification processing as further discussed below, by the image processing unit 104. The laser emitting unit 321 generates a laser beam through lens system 322, which reflects off reflecting mirror 323 to form an image on photosensitive body 324 directed to the image stored in the image recording unit 102.

The charger 325 uniformly charges the surface of the photosensitive body 324 to a predetermined high potential, and the laser beam scans the surface of this photosensitive body 324 to change the potential on the photosensitive body 324. This forms the latent image on the photosensitive body 324. This image is then transferred to a paper sheet stored in the recording paper cassettes 333a and 333b, and thereby an image of the scanned document is formed.

A first embodiment of the present invention will now be further described below referring to FIGS. 4–9.

Figure 4:
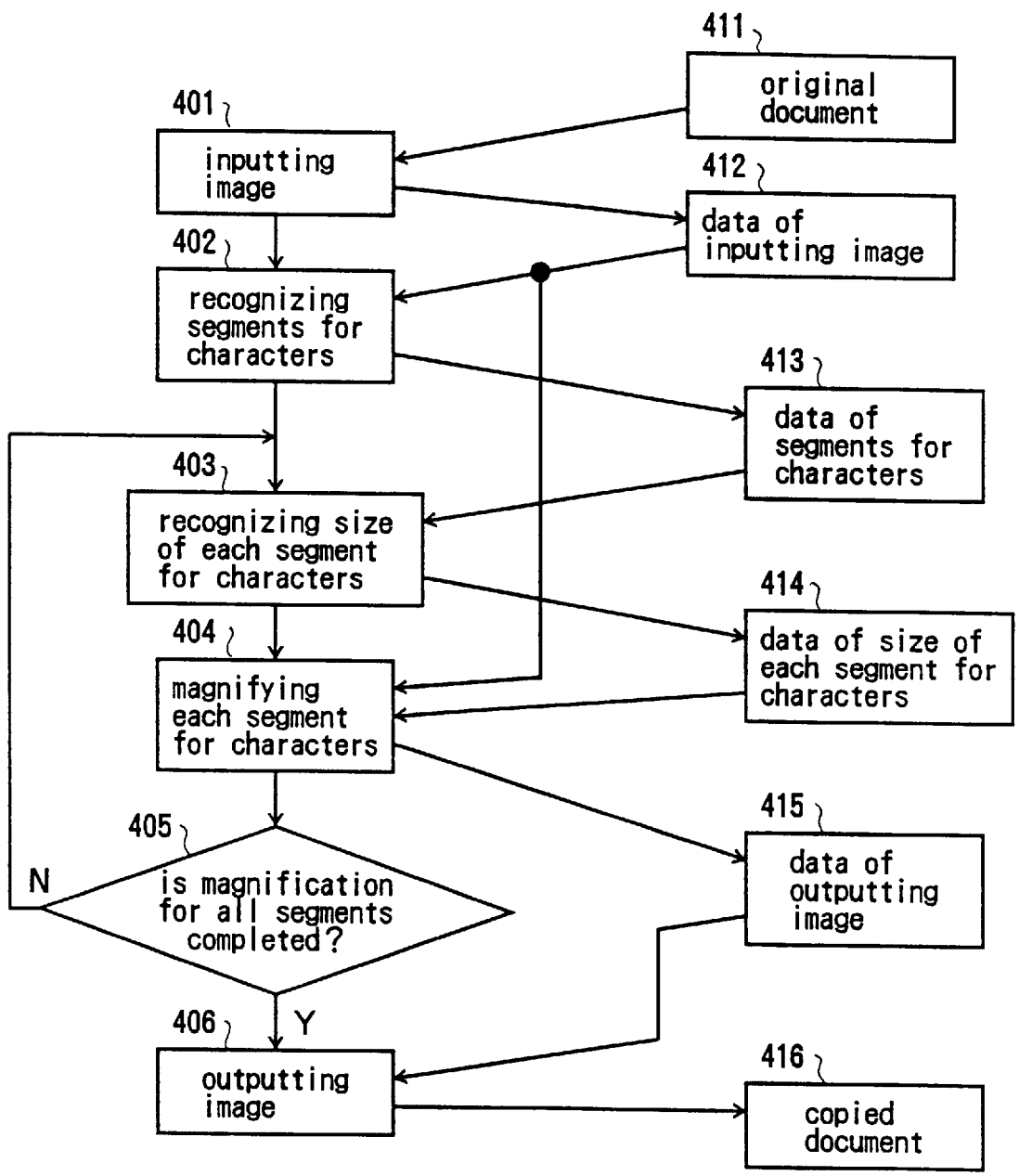
FIG. 4 is a flowchart explaining a magnification process in a first embodiment in accordance with the present invention.
Figure 7:
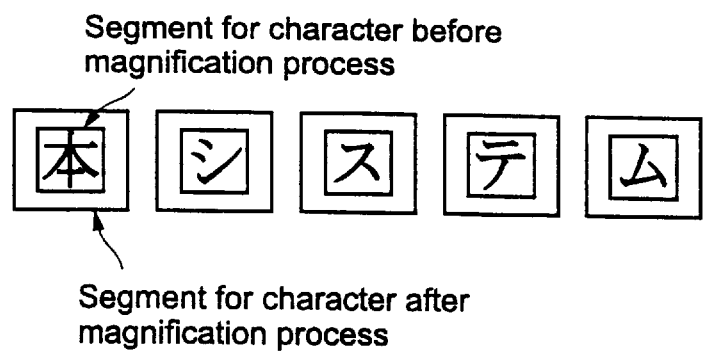
FIG. 7 is a drawing showing an enlargement of FIG. 6 before performing a magnification process in the first embodiment in accordance with the present invention.
Figure 8:
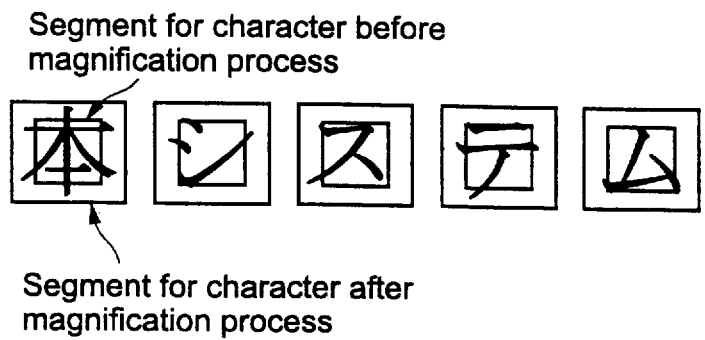
FIG. 8 is a drawing showing an enlargement of FIG. 6 after performing the magnification process in the first embodiment in accordance with the present invention.

FIG. 4 is a flowchart explaining a magnification process in a first embodiment in accordance with the present invention. This magnification process may be implemented on the original document shown in FIG. 5. FIG. 6 is a drawing showing segments for characters in the original document of FIG. 5, and FIG. 7 is a drawing showing an enlargement of FIG. 6 before performing the magnification process in accordance with the first embodiment of the present invention. FIG. 8 is a drawing showing an enlargement of FIG. 6 after performing the magnification process in accordance with the first embodiment of the present invention and FIG. 9 is a drawing showing a copied document formed with the magnification process in accordance with the first embodiment of the present invention.

As illustrated in FIG. 4, in a step 401, an original document 411 to be copied is set on the image inputting unit 101. An operator sets a desired magnification ratio for a magnification process to be executed on the original document 411 with the operating unit 105. The original document 411 is then scanned by the image inputting unit 101 by pushing a start button on operating part 105 and data of the scanned original document is then recorded in the image recording unit 102 as data of an input image 412.

In a step 402, segments for characters are recognized from the data of the input image 412 so as to form a data of segments for characters 413 as shown in FIG. 6. That is, segments are formed around the characters before the magnification process.

In a step 403, sizes of each segment for the characters on the original document are recognized from the data of the segments for characters 413 so as to form data of a size of each segment for characters 414 as shown in FIG. 7. That is, further outer segments are formed about the characters indicating a desired size of the characters after a desired magnification operation, see the outer segments around the characters in FIG. 7. Then, in a step 404, each segment for characters is magnified from the data of the size of each segment for characters 414 as a result to fit within the outer segments so as to form data of an output image 415 as shown in FIG. 8.

With this operation, a center of the original characters on the original document still correspond to that of the magnified characters. In this operation of the present invention, the first segment is formed just around the characters initially. A second segment is then formed around the characters indicating the desired degree of magnification of each character, see for example FIG. 7 of the present specification. Then, in the present invention the characters are magnified as a result to fill the area of the second outer segments. In this operation of the present invention, only the area within the segments is magnified, so that the characters themselves are magnified. However, in this operation of the present invention the area between the segments, i.e., the blank area between characters on the document, are not magnified. As a result, in the present invention only the characters themselves are magnified, whereas the area between the characters is not magnified. With this operation in the present invention, the characters can be magnified without requiring an increase in the overall size of the copied sheet recording the magnified characters.

In a step 405, whether magnification for all segments is completed or not is checked. If NO in step 405, the process returns to step 403 to complete magnification for all the segments. If Yes in step 405, in a step 406, an image is output from the data of output image 415 so as to form a copied document 416 as shown in FIG. 9. A size of the original document is thereby equal to that of the copied document.

In this first embodiment, the magnification ratio is set by the operator. However, if the magnification ratio is set to be extremely large, neighboring characters may overlap with each other. That is, if when the magnification ratio is set by the operator, the outer segments indicating the area which the characters are to occupy after magnification overlap with each other, then the characters will overlap with each other after the magnification process.

In a second embodiment of the present invention, this problem is solved. The second embodiment of the present invention will now be described below referring to FIGS. 10–14.

Figure 10:
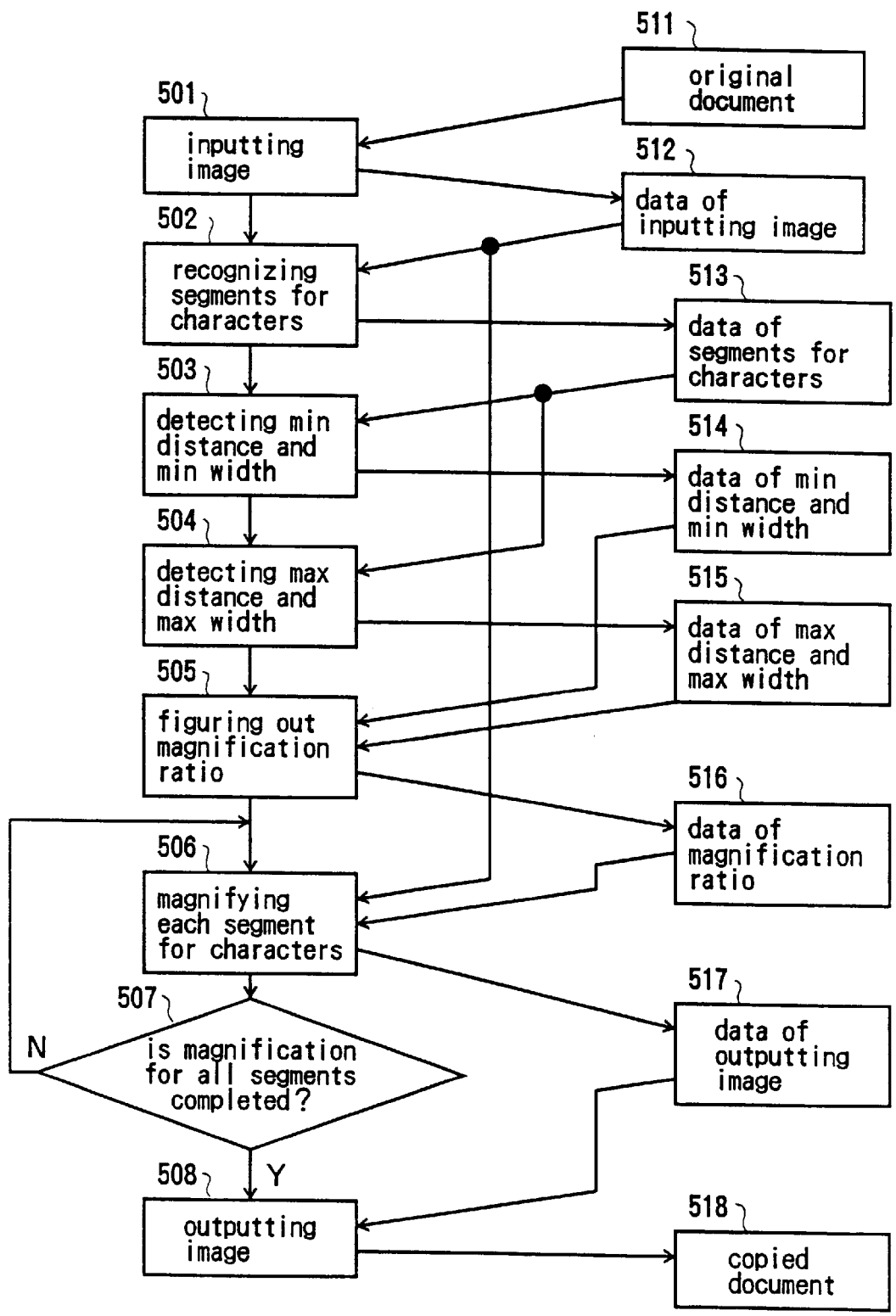
FIG. 10 is a flowchart explaining a magnification process in a second embodiment in accordance with the present invention.
Figure 11:
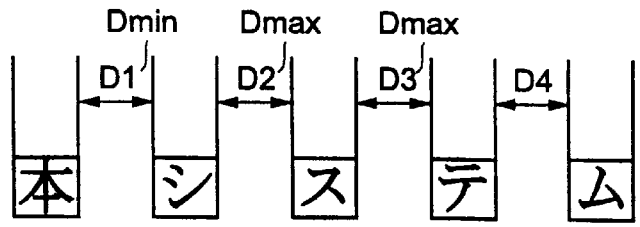
FIG. 11 is a drawing showing a distance between segments for characters in accordance with the present invention.
Figure 12:
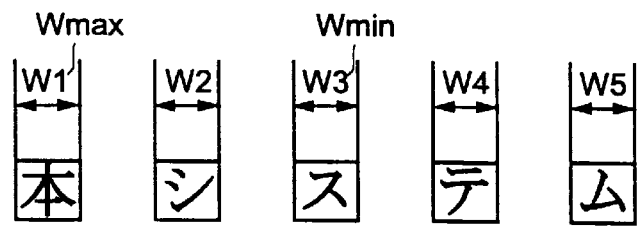
FIG. 12 is a drawing showing a width of each segment for characters in accordance with the present invention.
Figure 13:
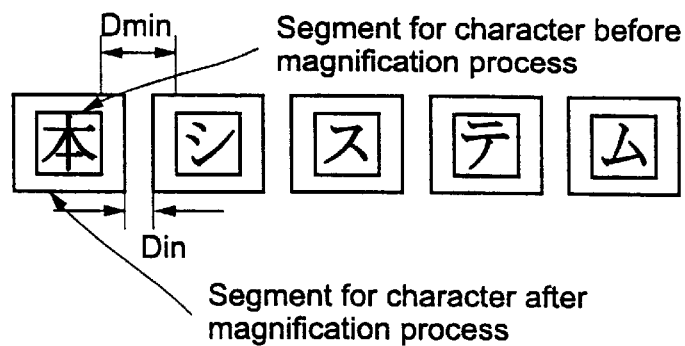
FIG. 13 is a drawing showing an enlargement of FIG. 6 before performing the magnification process in the second embodiment in accordance with the present invention.
Figure 14:
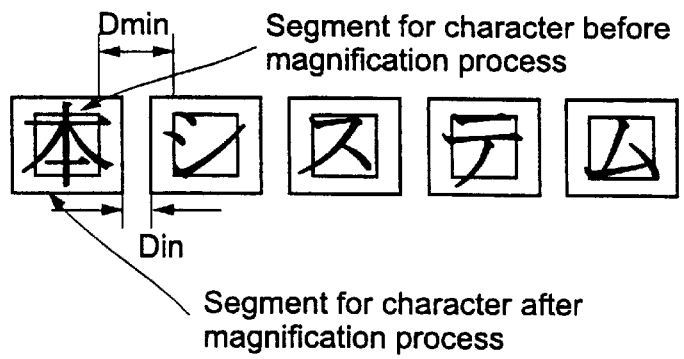
FIG. 14 is a drawing showing an enlargement of FIG. 6 after performing a magnification process in the second embodiment in accordance with the present invention.

FIG. 10 is a flowchart explaining a magnification process in the second embodiment in accordance with the present invention. FIG. 11 is a drawing showing a distance between segments for characters in accordance with the second embodiment of the present invention. FIG. 12 is a drawing showing a width of each segment for characters in accordance with the second embodiment of the present invention. FIG. 13 is a drawing showing an enlargement of FIG. 6 before performing the magnification process in accordance with the second embodiment of the present invention and FIG. 14 is a drawing showing an enlargement of FIG. 6 after performing the magnification process in accordance with the second embodiment of the present invention.

In a step 501, an original document 511 to be copied is set on the image inputting unit 101. The operator then sets an intended distance between segments for characters with the operating part 105. That is, the operator can set the distance which he wishes to maintain between the characters after a magnification process.

The original document 511 is then scanned by the image inputting unit 101 by pushing the start button on the operating part 105 and data of the scanned original document is then recorded in the image recording unit 102 as data of an input image 512.

In a step 502, segments for characters are recognized from the data of the input image 512 so as to form a data of segments for characters 513 again as shown in FIG. 6. In a step 503, a minimum distance D between neighboring segments, e.g. D1, for characters and a minimum width W, e.g. W3 (minimum width) of each segment for characters are detected from the data of segments for characters 513 so as to form a data of the minimum distance and the minimum width 514 as shown in respective FIGS. 11 and 12.

In a step 504, a maximum distance, e.g. D2,D3 (maximum distance) between neighboring segments for characters and a maximum width, e.g. W1 (maximum width) of each segment for characters are detected from the data of segments for characters 513 so as to form data of the maximum distance and the maximum width 515 as shown in FIGS. 11 and 12.

In a step 505, a magnification ratio is calculated to achieve an intended distance $D_{in}$ between segments for characters based on the data of the minimum distance and the minimum width 514, and the data of the maximum distance and the maximum width 515, so as to form a data of magnification ratio 516.

If $D_{in}$ (intended distance)<$D_{min}$ (minimum distance), a magnification ratio $Z=[W_{min}$ (minimum width)+$D_{min}$ (minimum distance)-$D_{in}$ (intended distance)]/$W_{min}$ (minimum width).

If $D_{in}$ (intended distance)>$D_{max}$ (maximum distance), a magnification ratio $Z=[W_{max}$ (maximum width+$D_{max}$ (maximum distance)-$D_{in}$ (intended distance)]/$W_{max}$ (maximum width).

If the magnification ratio Z<1, the magnification process is not performed because segments for the characters become too small. If $D_{min}$ (minimum distance)$\leq D_{in}$ (intended distance)$\leq D_{max}$ (maximum distance), the distance between segments for characters varies widely so that the magnification process is not performed.

In a step 506, each segment for characters is magnified from the data of magnification ratio 516 so as to form data of an output image 517 as shown in FIGS. 13 and 14.

Again with this operation in the present invention, a center of original characters corresponds to that of magnified characters. Thus, only the characters in the original document within the segments are magnified to be printed on a sheet of paper which is of a same size as the original document.

In a step 507, whether magnification for all segments is completed or not is checked. If NO in step 507, the process returns to step 506 to complete magnification for all segments. If YES in step 507, in a step 508 an image is output from the data of output image 517 so as to form a copied document 518 as shown in FIG. 9.

Thus, with the magnification process of the second embodiment, a size of the original document is equal to that of the copied document.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image processing apparatus, comprising:
    a scanner for scanning an original document including characters to be copied;
    an input unit for inputting a desired magnification ratio for magnifying said original document;
    a control unit for segmenting the characters in the original document, for detecting segments of the characters, and for magnifying the characters within the segments by the desired magnification ratio to be centered within the segments without magnifying an area between the segments, to generate a magnified copy document of a same size as the original document.

2. The image processing apparatus according to claim 1, wherein a minimum distance to be maintained between the characters after the magnifying is input through the input unit to calculate the desired magnification ratio.

3. An image forming apparatus comprising:

a scanner for scanning an original document including characters to be copied;

an input unit for inputting an intended distance between the characters for magnifying said original document;

a control unit for segmenting the characters in the original document and for magnifying the characters within the segments by a calculated magnification ratio to be centered within the segments, to generate a magnified copy document of a same size as the original document;

wherein the intended distance to be maintained between the characters after the magnifying is input through the input unit to calculate the magnification ratio, and wherein the magnification ratio is calculated based on the input intended distance and a detected maximum or minimum distance between the characters on the original document.

4. The image forming apparatus according to claim 3, wherein the desired magnification ratio is calculated further based on detected maximum and minimum widths of the characters on the original document.

5. An image processing apparatus, comprising:

scanner means for scanning an original document including characters to be copied;

input means for inputting a desired magnification ratio for magnifying said original document;

a control means for segmenting the characters in the original document, for detecting segments of the characters, and for magnifying the characters within the segments by the desired magnification ratio to be centered within the segments without magnifying an area between the segments, to generate a magnified copy document of a same size as the original document.

6. The image processing apparatus according to claim 5, wherein a minimum distance to be maintained between the characters after the magnifying is input through the input means to calculate the desired magnification ratio.

7. An image forming apparatus comprising:

scanner means for scanning an original document including characters to be copied;

input means for inputting an intended distance between the characters for magnifying said original document;

a control means for segmenting the characters in the original document and for magnifying the characters in the original document and for magnifying the characters within the segments by a calculated magnification ratio to be centered within the segments, to generate a magnified copy document of a same size as the original document;

wherein the intended distance to be maintained between the characters after the magnifying is input through the input means to calculate the magnification ratio, and wherein the magnification ratio is calculated based on the input intended distance and a detected maximum or minimum distance between the characters on the original document.

8. The image forming apparatus according to claim 7, wherein the desired magnification ratio is calculated further based on detected maximum and minimum widths of the characters on the original document.

9. A method for copying an original document, comprising the steps of:

scanning an original document including characters to be copied;

inputting a desired magnification ratio for magnifying said original document;

segmenting the characters in the original document, detecting segments of the characters, and magnifying the characters within the segments by the desired magnification ratio to be centered within the segments without magnifying an area between the segments, to generate a magnified copy document of a same size as the original document.

10. The method according to claim 9, wherein a minimum distance to be maintained between the characters after the magnifying is input in the inputting step to calculate the desired magnification ratio.

11. A method for copying an original document, comprising the steps of:

scanning an original document including characters to be copied;

inputting an intended distance between the characters for magnifying said original document;

segmenting the characters in the original document and magnifying the characters within the segments by a calculated magnification ratio to be centered within the segments, to generate a magnified copy document of a same size as the original document;

wherein the intended distance to be maintained between the characters after the magnifying is input in the inputting step to calculate the magnification ratio, and wherein in the inputting step the magnification ratio is calculated based on the input intended distance and a detected maximum or minimum distance between the characters on the original document.

12. The method according to claim 11, wherein in the inputting step the desired magnification ratio is calculated further based on detected maximum and minimum widths of the characters on the original document.

13. A computer readable media to control an image processing apparatus to copy an original document by performing the steps of:

scanning an original document including characters to be copied;

inputting a desired magnification ratio for magnifying said original document;

segmenting the characters in the original document, detecting segments of the characters, and magnifying the characters within the segments by the desired magnification ratio to be centered within the segments without magnifying an area between the segments, to generate a magnified copy document of a same size as the original document.

14. The method according to claim 13, wherein a minimum distance to be maintained between the characters after the magnifying is input in the inputting step to calculate the desired magnification ratio.

15. A computer readable media to control an image processing apparatus to copy an original document by performing the steps of:

scanning an original document including characters to be copied;

inputting an intended distance between the characters for magnifying said original document;

segmenting the characters in the original document and magnifying the characters within the segments by a calculated magnification ratio to be centered within the segments, to generate a magnified copy document of a same size as the original document;

wherein the intended distance to be maintained between the characters after the magnifying is input in the inputting step to calculate the magnification ratio, and wherein in the inputting step the magnification ratio is calculated based on the input intended distance and a detected maximum or minimum distance between the characters on the original document.

16. The computer readable media according to claim 15, wherein in the inputting step the desired magnification ratio is calculated further based on detected maximum and minimum widths of the characters on the original document.

* * * * *